Fig. 5
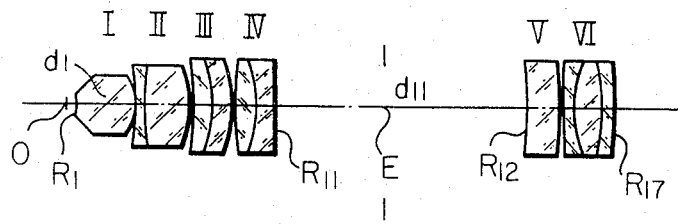
N.A. = 0.4   f = 10
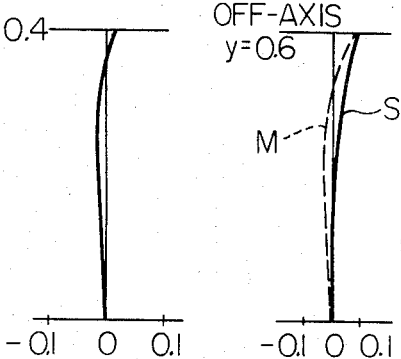
Fig. 6A   Fig. 6B
S: Sagittal
M: Meridional
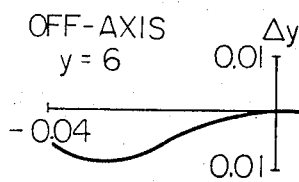
Fig. 6C
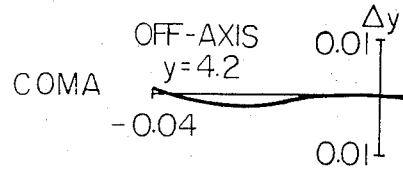
Fig. 6D United States Patent Office 3,664,728
Patented May 23, 1972

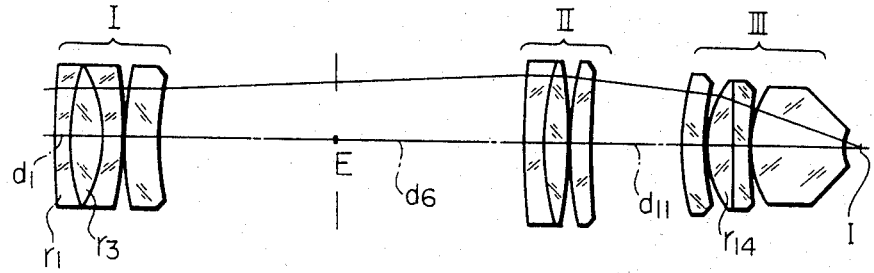
Fig. 1
f=50  N.A.=0.4  β = 1/10 X
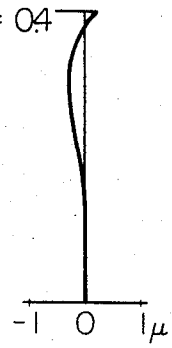
Fig. 2A — SPHERICAL ABERRATION (TRANSVERSE) N.A.=0.4
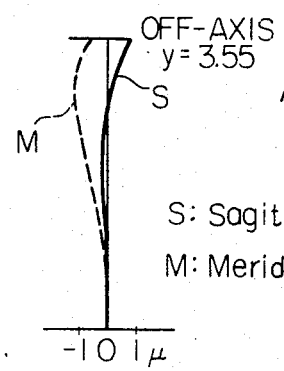
Fig. 2B — ASTIGMATISM OFF-AXIS y=3.55
S: Sagittal
M: Meridional
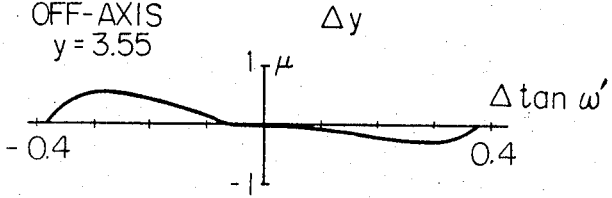
Fig. 2C — COMA OFF-AXIS y=3.55
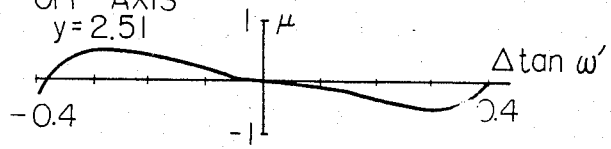
Fig. 2D — COMA OFF-AXIS y=2.51
INVENTOR
KOICHI YUTA
BY Kurt Kelman
AGENT

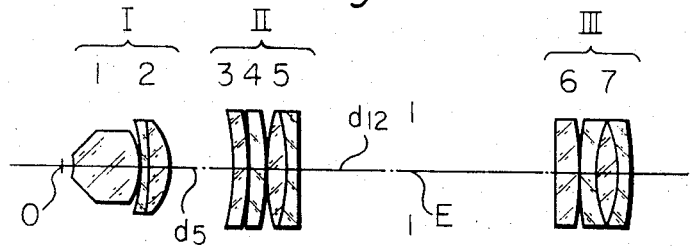
Fig. 3
N.A. = 0.4  f = 10
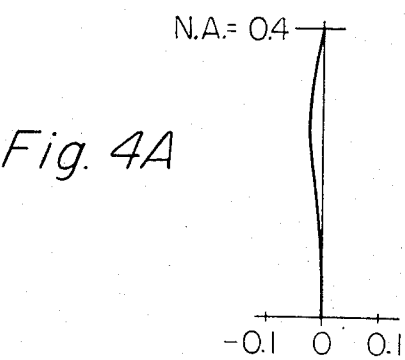
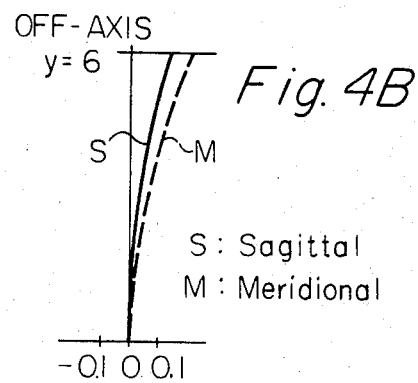
Fig. 4A — SPHERICAL ABERRATION
Fig. 4B — ASTIGMATISM
S: Sagittal
M: Meridional
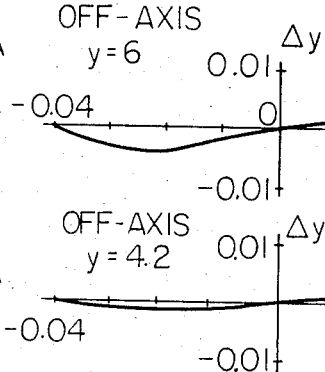
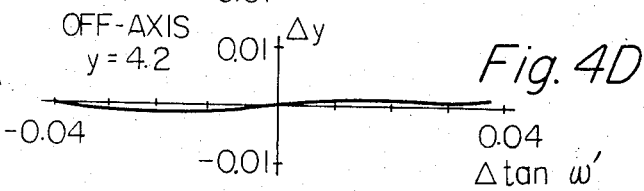
Fig. 4C — COMA OFF-AXIS y=6
Fig. 4D — COMA OFF-AXIS y=4.2

3,664,728
OBJECTIVE HAVING A HIGH RESOLVING POWER
Koichi Yuta, Tokyo, Japan, assignor to Olympus
Optical Co., Ltd., Tokyo, Japan
Filed Sept. 30, 1970, Ser. No. 76,682
Claims priority, application Japan, Oct. 1, 1969,
44/78,049; Oct. 2, 1969, 44/78,437, 44/78,438
Int. Cl. G02b 9/62, 9/64
U.S. Cl. 350—214        9 Claims

ABSTRACT OF THE DISCLOSURE

Objective having a high resolving power reaching Rayleigh limit, which comprises first to third parts beginning at the object side and spaced a distance from each other. The first part consists of a first and second lens groups of which the first lens group includes cemented three lens elements with its intermediate lens element being of a convex lens element while the second lens group is located closely adjacent to the first lens group. The second part consists of third and fourth lens groups at least one of which is constituted by cemented lens elements. The third part consists of fifth to seventh lens groups located closely adjacent to each other of which the sixth lens group is constituted by cemented lens elements while the seventh lens group is of a meniscus having a great thickness. The objective satisfies the following relationships:

$$1.2 > -r_3 > 0.8f$$
$$0.6f < r_{14} < 0.8f$$
$$0.4f < d_{11} < 0.8f$$
$$40f < |f_{\mathrm{I}}|$$
$$1.2f < f_{\mathrm{II}} < 3f$$

where:

$f$ = the focal length of the entire system
$f_{\mathrm{I}}$ = the focal length of the first part
$f_{\mathrm{II}}$ = the focal length of the second part
$r_3$ = the radius of curvature of the surface of lens element located at the third from the object side, wherein cemented surfaces are counted as being one surface
$r_{14}$ = the radius of curvature of the surface of the lens element which is fourteenth from the object side, wherein cemented surfaces are counted as being one
$d_{11}$ = the distance between the second and the third part.

BACKGROUND OF THE INVENTION

The present invention relates to an objective having a high resolving power reaching Rayleigh limit.

The present invention is particularly useful for reproducing a fine pattern in producing integrated circuits, for example, and is also particularly useful for use in a microscope.

Heretofore, an objective for use in reproducing a fine pattern in producing integrated circuit is usually constructed as an optical system in which a monochromatic light is used. The wave length of the light is determined depending upon the nature of the light source and the kind of the photosensitive material. In general, a high pressure mercury vapor lamp having the wave length of 435.8 mµ is used as the light source.

The present invention aims at improving the performance of the objective utilizing the light having the wave length of 435.8 mµ.

SUMMARY OF THE INVENTION

An object of the present invention is to provide a novel and useful objective having a high resolving power such as reaching Rayleigh limit in which the light having the wave length of 435.8 mµ is used.

Another object is to provide a novel and useful objective of the type described above which is particularly useful for reproducing a pattern in producing integrated circuits and the like.

A further object is to provide a novel and useful objective for microscope having a high resolving power such as reaching Rayleigh limit, in which the light having the wave length of 435.8 mµ is used.

In accordance with one feature of the present invention, an objective for reproducing a fine pattern is provided which has the magnification of ⅒, the numerical aperture N.A. of 0.4, i.e., the relative aperture of F/1.1 and by which fine lines of 1500 mm. can be sharply resolved.

In accordance with another feature of the present invention, an objective for a microscope is provided which has a wide field of the numerical aperture N.A. of about 0.4 and still has a high resolving power reaching Rayleigh limit.

In general, an objective for a microscope would have been able to have a resolving power reaching Rayleigh limit depending upon its numerical aperture if residual aberrations such as the spherical aberration and the curvature of field were completely eliminated. However, such a high resolving power can practically be obtained only in a very small portion in the field at the center therof and the resolving power is rapidly deteriorated in the area out of the small central portion of the field as in the case of an apochromat.

In the present invention, it has been found that an objective having a high resolving power reaching Rayleigh limit over the wide field of view can be obtained when the entire optical system thereof is divided into three parts separated from each other, and the first part at the object side is constituted by two or three lens groups each in the form of meniscus and located closely to each other and third part at the image side is constituted by two lens groups located closely to each other while the second part intermediate the first and the third lens group is constituted by two or three lens groups closely located to each other so that an exit pupil is positioned between the second and the third part.

In accordance with a further feature of the present invention, it has been found that an objective for a microscope having a high resolving power reaching Rayleigh limit under the condition of the numerical value of 0.4 is provided, when the entire optical system is divided into two parts with the first one being located at the object side with respect to the exit pupil while the second one is located at the image side with respect to the exit pupil, the first one is located at the image side with respect to the exit pupil, the first part being constituted by three or four lens groups located closely to each other and each either in the form of a single lens element or in the form of cemented lens elements while the second part is constituted by two lens groups closely located to each other and each either in the form of a single lens element or in the form of cemented lens elements.

BRIEF DESCRIPTION OF THE DRAWINGS

FIG. 1 is a longitudinal sectional view showing the first embodiment of the objective of the present invention;

FIGS. 2A–2D show various aberration curves of the objective shown in FIG. 1;

FIG. 3 is a longitudinal sectional view showing the second embodiment of the present invention;

FIGS. 4A–4D show various aberration curves of the objective shown in FIG. 3;

FIG. 5 is a longitudinal sectional view showing the third embodiment of the present invention; and FIGS. 6A–6D show various aberration curves of the objective shown in FIG. 5.

DETAILED DESCRIPTION OF THE PREFERRED EMBODIMENTS

Referring to FIG. 1, the first embodiment of the objective of the present invention particularly useful for use in reproducing a pattern in the production of integrated circuits, for example, has seven lens groups, the first and the second lens group at the objective side constitute a first part of the objective and are closely located to each other. The third and the fourth lens group constitute a second part spaced a fairly great distance from the first part, the fourth lens group being located closely to the third lens group. The fifth to the seventh lens group constitute the third part spaced a distance from the second part, the fifth to the seventh lens group being located closely to each other. The first lens group consists of three lens elements cemented to each other with the intermediate lens element being in the form of a convex lens element, and the second lens group is of a single concave meniscus with its concave surfaces being directed to the image side. The third lens group consists of two lens element cemented to each other and having a positive power with their cemented surfaces being concave toward the image side, and the fourth lens group is of a positive meniscus with its weak convex surfaces directed toward the object side. The fifth lens group is of a positive meniscus with its concave surfaces being directed toward the image side, and the sixth lens group consists of two lens elements cemented to each other in the form of a meniscus as a whole with the concave surfaces thereof directed toward the image side, the front lens element at the object side being positive while the rear lens element at the image side being negative. The seventh lens group is of a negative meniscus having a great thickness with its concave surfaces directed to the image side. The entrance pupil E is located between the first and the second part.

The objective described above is characterized in that is satisfies the following relationships:

$$1.2f > -r_3 > 0.8f$$
$$0.6f < r_{14} < 0.8f$$
$$0.4f < d_{11} < 0.8f$$
$$40f < |f_\mathrm{I}|$$
$$1.2f < f_\mathrm{II} < 3f$$

where:

$f$ = the focal length of the entire system of the objective
$f_\mathrm{I}$ = the focal length of the first part of the objective
$f_\mathrm{II}$ = the focal length of the second part of the objective
$r_3$ = the radius of curvature of the third surface of lens element at the object side
$r_{14}$ = the radius of curvature of the surface of the lens element which is fourteenth from the object side
$d_{11}$ = the distance between the second and the third part of the objective The requirements for $-r_3$ are for mainly reducing as small as possible the astigmastism appearing in the off-axial oblique ray. The upper and the lower limit are for preventing the meridional image from becoming excessively positive or negative with respect to the segittal image.

The requirements for $r_{14}$ are for mainly improving the spherical aberration. The upper and the lower limit are selected so as to appropriately avoid the over- and under correction of the spherical aberration. And, at the same time, the lower limit is selected so as to prevent the curvature of field from increasing.

The requirements for $d_{11}$ have relationship to the allowable value of $f_\mathrm{II}$. The requirements for $d_{11}$ and $f_\mathrm{II}$ are effective for improving the characteristics in the off-axial rays mainly for improving the coma, and the upper and lower limit are for preventing the transverse aberrations in the upper and lower light bundle with respect to the principal off-axial light ray positioned therebetween from being excessively deviated thereby permitting them to be balanced. The upper limit for $d_{11}$ is also for preventing the working distance from being made extremely small.

The requirements for $f_\mathrm{I}$ are important for the objective and they are effective to finely regulate the delicate balancing between the respective aberrations without affecting the balancing of the various aberrations as a whole. These requirements are particularly effective for the balancing of the coma appearing in the off-axial rays and for the fine compensation for the astigmatism in the off-axial rays. If the refractive powers in these portions are made great in order to finely regulate the balancing of the aberrations as a whole while the magnification is kept constant variation in the aberrations tends to be made great, thereby resulting in difficulties in designing the objective. Although the resultant refractive power of the first and the second lens groups is made substantially zero, the refractive power of the respective surface of each of the lens elements thereof is not small, and a good results are obtained when a refractive power about the same as that of the entire system of the objective is given to the convex lens element located at the center of the first lens group.

The following two eaxmples are designed in accordance with the above requirements under the condition of the focal length $f=50$ mm.

EXAMPLE 1

| | | | |
|---|---|---|---|
| $r_1 = 240.603$ | $d_1 = 5.659$ | | |
| $r_2 = 72.030$ | $d_2 = 12.575$ | $n = 1.56395$ | $\nu = 45.4$ |
| $r_3 = -51.849$ | $d_3 = 5.659$ | $n = 1.49593$ | $\nu = 69.8$ |
| $r_4 = 259.303$ | $d_4 = 1.258$ | $n = 1.70970$ | $\nu = 53.3$ |
| $r_5 = 133.024$ | $d_5 = 12.575$ | | |
| $r_6 = 118.242$ | $d_6 = 132.042$ | $n = 1.65306$ | $\nu = 60.2$ |
| $r_7 = 296.530$ | $d_7 = 6.288$ | | |
| $r_8 = 94.606$ | $d_8 = 9.557$ | $n = 1.67248$ | $\nu = 33.8$ |
| $r_9 = -171.283$ | $d_9 = 0.629$ | $n = 1.58142$ | $\nu = 43.7$ |
| $r_{10} = 122.892$ | $d_{10} = 7.545$ | | |
| $r_{11} = 289.431$ | $d_{11} = 32.508$ | $n = 1.65306$ | $\nu = 60.2$ |
| $r_{12} = 85.125$ | $d_{12} = 7.545$ | | |
| $r_{13} = 95.707$ | $d_{13} = 0.629$ | $n = 1.65306$ | $\nu = 60.2$ |
| $r_{14} = 35.703$ | $d_{14} = 10.060$ | | |
| $r_{15} = 1,067.608$ | $d_{15} = 5.030$ | $n = 1.49593$ | $\nu = 69.8$ |
| $r_{16} = 95.687$ | $d_{16} = 0.629$ | $n = 1.67249$ | $\nu = 33.8$ |
| $r_{17} = 37.304$ | $d_{17} = 33.954$ | | |
| $r_{18} = 16.377$ | | $n = 1.49593$ | $\nu = 69.8$ | where:

$r_i$ ($i=1, 2 \ldots 18$) = the radius of curvature of the respective surface of each of the lens elements beginning at the object side, the numeral being commonly used for the cemented surfaces.

$d_i$ ($i=1, 2 \ldots 17$) = the thickness of each of the lens elements and the air gap beginning at the object side $n$ = refractive index with respect to the light having the wave length of 435.8 m$\mu$ of the respective lens element beginning at the object side $\nu$ = Abbe number with respect to the light having the wave length of 587.6 m$\mu$ of the respective lens element beginning at the object side and $r_3 = -1.037f$
$r_{14} = 0.714f$
$d_{11} = 0.650f$
$f_2 = 1.258f$
$f_\mathrm{I} = -61.342f$
$f_\mathrm{II} = 2.580f$ where $f_2$ = the focal length of the convex lens element located at the center of the first lens group.

EXAMPLE 2

| | | | |
|---|---|---|---|
| $r_1$=247.401 | $d_1$=5.53 | | |
| $r_2$=71.967 | $d_2$=12.30 | $n$=1.56395 | $\nu$=45.4 |
| $r_3$=−51.124 | $d_3$=5.53 | $n$=1.49593 | $\nu$=69.8 |
| $r_4$=−252.997 | $d_4$=1.23 | $n$=1.71060 | $\nu$=50.7 |
| $r_5$=126.573 | $d_5$=12.30 | | |
| $r_6$=118.794 | $d_6$=129.11 | $n$=1.65306 | $\nu$=60.2 |
| $r_7$=290.847 | $d_7$=6.15 | | |
| $r_8$=91.210 | $d_8$=9.34 | $n$=1.67248 | $\nu$=33.8 |
| $r_9$=−159.674 | $d_9$=0.61 | $n$=1.57976 | $\nu$=63.1 |
| $r_{10}$=125.754 | $d_{10}$=7.38 | | |
| $r_{11}$=263.44 | $d_{11}$=31.78 | $n$=1.65306 | $\nu$=60.2 |
| $r_{12}$=81.732 | $d_{12}$=7.38 | | |
| $r_{13}$=95.253 | $d_{13}$=0.61 | $n$=1.65306 | $\nu$=60.2 |
| $r_{14}$=34.512 | $d_{14}$=9.84 | | |
| $r_{15}$=764.912 | $d_{15}$=4.92 | $n$=1.49593 | $\nu$=69.8 |
| $r_{16}$=87.755 | $d_{16}$=0.61 | $n$=1.67248 | $\nu$=33.8 |
| $r_{17}$=36.387 | $d_{17}$=33.20 | | |
| $r_{18}$=16.019 | | $n$=1.49593 | $\nu$=69.8 | where:

$r_i$ ($i$=1, 2 ... 18) = the radius of curvature of the respective surface of each of the lens elements beginning at the object side, numeral being commonly used for the cement surface $d_i$ ($i$=1, 2 ... 17) = the thickness of each of the lens elements and the air gap beginning at the object side $n$ = refractive index with respect to the light having the wave length of 435.8 m$\mu$ of the respective lens element beginning at the object side $\nu$ = Abbe number with respect to the light having the wave length of 587.6 m$\mu$ of the respective lens element beginning at the object side and $r_3 = -1.022f$
$r_{14} = 0.692f$
$d_{11} = 0.636f$
$f_2 = 1.014f$
$f_\tau = 133.36f$
$f_{II} = 2.127f$ where:

$f_2$ = the focal length of the convex lens element located at the center of the first lens group.

Various aberrations of Example 2 are shown in FIGS. 2A–2D. The transverse aberration of the axial spherical aberration is shown in FIG. 2A, the off-axial astigmatism at $y$=3.55 being shown in FIG. 2B, the transverse aberration of the off-axial coma at $y$=3.55 and $y$=2.51 being shown in FIGS. 2C, 2D, respectively.

The following table shows the Berek's expression obtained by Seidel coefficients calculated under the conditions that the focal length $f$ of the entire system is made $l$ and a parallel light bundle is incident to the objective.

| | A | B | Γ | P | Δ |
|---|---|---|---|---|---|
| 1 | 0.002 | 0.047 | 0.009 | 0.073 | 0.591 |
| 2 | −0.015 | −0.019 | −0.017 | −0.020 | −0.044 |
| 3 | −0.171 | −0.033 | 0.075 | −0.082 | 0.050 |
| 4 | 0.002 | 0.043 | −0.009 | 0.082 | −0.605 |
| 5 | 0.014 | 0.120 | 0.041 | 0.156 | 0.805 |
| 6 | −0.016 | −0.148 | −0.048 | −0.166 | −0.966 |
| 7 | 0.001 | 0.109 | 0.012 | 0.069 | 1.654 |
| 8 | −0.009 | −0.192 | −0.041 | −0.019 | −0.996 |
| 9 | 0.055 | 0.127 | 0.084 | 0.115 | 0.367 |
| 10 | −0.001 | −0.130 | −0.012 | 0.157 | 0.283 |
| 11 | 0.006 | 0.028 | −0.013 | −0.075 | 0.098 |
| 12 | −0.000 | −0.261 | −0.007 | 0.242 | −0.662 |
| 13 | 0.001 | 0.154 | −0.013 | −0.207 | 0.634 |
| 14 | −0.005 | −0.342 | −0.041 | 0.480 | 1.161 |
| 15 | −0.025 | −0.206 | −0.072 | 0.005 | −0.580 |
| 16 | 0.034 | 0.010 | 0.018 | −0.229 | −0.119 |
| 17 | −0.001 | −0.341 | 0.018 | 0.455 | −2.216 |
| 18 | −0.001 | −0.001 | 0.001 | −0.035 | 1.325 |
| Σ | 0.128 | −1.036 | −0.015 | 0.000 | 0.781 |

Referring to FIG. 3 showing the second embodiment of the objective of the present invention particularly useful in a microscope using the light of mercury y-line having the wave length of 435.8 m$\mu$, the optical system of the objective comprises seven lens groups of which the first and the second lens group at the object side are located closely to each other and constitute a first part of the objective and the third to the fifth lens group are located closely to each other and constitute a second part spaced a distance from the first part, while the sixth and the seventh lens group are located closely to each other and constitute a third part spaced a distance from the second part, the exit pupil E being located between the second and the third part.

The first lens group is of a meniscus with its convex surfaces directed toward the image side, and each of the second to fourth lens group is of a meniscus with its convex surfaces directed to the image side, at least the second lens group consisting of cemented lens elements having a positive power with the cemented surfaces thereof being convex toward the image side. The fifth lens group consists of cemented lens elements having a positive power with the cemented surfaces thereof being convex toward the image side, and the sixth lens group is of a meniscus having a weak refractive power with its convex surfaces directed toward the image side, while the seventh lens group consists of three lens elements cemented to each other of which the intermediate lens element is of a convex lens element.

The objective described above is characterized in that it satisfies the following relationships:

$3.5f < f_I < 3.6f$
$2.1f < f_{II} < 2.2f$
$21f < f_{III} < 22f$
$0.55f < l_1 < 0.57f$
$2.2f < l_2 < 2.3f$ where:

$f$ = the focal length of the entire system of the objective
$f_I$ = the focal length of the first part of the objective
$f_{II}$ = the focal length of the second part of the objective
$f_{III}$ = the focal length of the third part of the objective
$l_1$ = the distance between the first and the second part of the objective
$l_2$ = the distance between the second and third part of the objective The following two examples are obtained in accordance with the above requirements in which a monochromatic light having the wave length of 435.8 m$\mu$ is used and the magnification is selected to be 10×.

EXAMPLE 3

| | | | |
|---|---|---|---|
| $r_1$=−2.766 | $d_1$=5.866 | | |
| $r_2$=−6.373 | $d_2$=0.109 | $n$=1.49593 | $\nu$=69.8 |
| $r_3$=−14.847 | $d_3$=0.869 | | |
| $r_4$=−66.620 | $d_4$=1.738 | $n$=1.63103 | $\nu$=43.8 |
| $r_5$=−5.875 | $d_5$=5.653 | $n$=1.43951 | $\nu$=45.2 |
| $r_6$=−29.693 | $d_6$=1.304 | | |
| $r_7$=−19.660 | $d_7$=0.109 | $n$=1.65306 | $\nu$=60.2 |
| $r_8$=−89.050 | $d_8$=1.304 | | |
| $r_9$=−28.327 | $d_9$=0.109 | $n$=1.65306 | $\nu$=60.2 |
| $r_{10}$=23.348 | $d_{10}$=1.651 | | |
| $r_{11}$=−21.171 | $d_{11}$=1.086 | $n$=1.57976 | $\nu$=63.1 |
| $r_{12}$=337.616 | $d_{12}$=22.813 | $n$=1.67248 | $\nu$=33.8 |
| $r_{13}$=−44.285 | $d_{13}$=2.173 | | |
| $r_{14}$=−28.705 | $d_{14}$=0.217 | $n$=1.65306 | $\nu$=60.2 |
| $r_{15}$=70.301 | $d_{15}$=0.978 | | |
| $r_{16}$=9.818 | $d_{16}$=2.173 | $n$=1.69992 | $\nu$=32.1 |
| $r_{17}$=−12.407 | $d_{17}$=0.978 | $n$=1.49593 | $\nu$=69.8 |
| $r_{18}$=−46.030 | | $n$=1.56395 | $\nu$=45.4 | where:

$r_i$ ($i$=1, 2 ... 18) = the radius of curvature of the respective surface of each of the lens elements beginning at the object side, the numeral being commonly used for the cemented surfaces $d_i$ ($i$=1, 2 ... 17) = the thickness of each of the lens elements and the air gap beginning at the object side $n$ = refractive index with respect to the light having the wave length of 435.8 m$\mu$ of the respective lens element beginning at the object side $\nu$ = Abbe number with respect to the light having the wave length of 587.6 m$\mu$ of the respective lens element beginning at the object side and $f_I = 34.95 \doteq 3.50f$
$f_{II} = 21.39 \doteq 2.14f$
$f_{III} = 219.56 \doteq 22.0f$
$l_1 = d_5 = 5.653 \doteq 0.57f$
$l_2 = d_{12} = 22.813 \doteq 2.28f$

EXAMPLE 4

| | | | |
|---|---|---|---|
| $r_1 = -2.774$ | $d_1 = 5.860$ | | |
| $r_2 = -6.355$ | $d_2 = 0.108$ | $n = 1.49593$ | $\nu = 69.8$ |
| $r_3 = -14.341$ | $d_3 = 0.868$ | | |
| $r_4 = -65.008$ | $d_4 = 1.736$ | $n = 1.63103$ | $\nu = 43.8$ |
| $r_5 = -5.867$ | $d_5 = 5.648$ | $n = 1.43951$ | $\nu = 95.2$ |
| $r_6 = -29.273$ | $d_6 = 1.302$ | | |
| $r_7 = -18.883$ | $d_7 = 0.108$ | $n = 1.65306$ | $\nu = 60.2$ |
| $r_8 = -83.944$ | $d_8 = 1.302$ | | |
| $r_9 = -28.814$ | $d_9 = 0.108$ | $n = 1.65306$ | $\nu = 60.2$ |
| $r_{10} = 22.720$ | $d_{10} = 1.650$ | | |
| $r_{11} = -20.449$ | $d_{11} = 1.085$ | $n = 1.57976$ | $\nu = 63.1$ |
| $r_{12} = 253.100$ | $d_{12} = 22.791$ | $n = 1.67248$ | $\nu = 33.8$ |
| $r_{13} = -46.050$ | $d_{13} = 2.170$ | | |
| $r_{14} = -28.361$ | $d_{14} = 0.217$ | $n = 1.65306$ | $\nu = 60.2$ |
| $r_{15} = 72.420$ | $d_{15} = 0.977$ | | |
| $r_{16} = 9.799$ | $d_{16} = 2.170$ | $n = 1.69992$ | $\nu = 32.1$ |
| $r_{17} = 12.007$ | $d_{17} = 0.977$ | $n = 1.49593$ | $\nu = 69.8$ |
| $r_{18} = -46.832$ | | $n = 1.56395$ | $\nu = 45.4$ | where:

$ri$ ($i = 1, 2 \ldots 18$) = the radius of curvature of the respective surface of each of the lens elements beginning at the object side, the numeral being commonly used for the cemented surfaces $di$ ($i = 1, 2 \ldots 17$) = the thickness of each of the lens elements and the air gap beginning at the object side $n$ = refractive index with respect to the light having the wave length of 435.8 m$\mu$ of the respective lens element beginning at the object side $\nu$ = Abbe number with respect to the light having the wave length of 578.6 m$\mu$ of the respective lens element beginning at the object side and $f_I = 35.72 \doteq 3.57f$
$f_{II} = 21.32 \doteq 2.13f$
$f_{III} = 215.04 \doteq 21.5f$
$l_1 = d_5 = 5.648 \doteq 0.56f$
$l_2 = d_{12} = 22.791 \doteq 2.28f$ Various aberrations of Example 4 are shown in FIGS. 4A–4D. FIG. 4A shows the longitudinal aberration of the spherical aberration, FIG. 4B showing the off-axial astigmatism at $y = 6$, while FIGS. 4C, 4D show the transverse aberrations of the off-axial coma at $y = 6$ (marginal zone) and $y = 4.2$ (intermediate annular zone), respectively.

The following table shows the Berek's expression obtained by Seidel coefficients calculated under the conditions that a parallel light bundle is incident to the objective in the reverse direction and the value of $f$ is made to 1.

| | A | B | x | Γ | Δ |
|---|---|---|---|---|---|
| 18 | 0.002 | 0.049 | 0.010 | 0.077 | 0.591 |
| 17 | -0.028 | -0.024 | -0.026 | -0.024 | -0.044 |
| 16 | -0.186 | -0.036 | 0.082 | -0.082 | 0.051 |
| 15 | 0.000 | 0.004 | -0.000 | 0.057 | -0.647 |
| 14 | 0.017 | 0.140 | 0.049 | 0.139 | 0.756 |
| 13 | -0.000 | -0.024 | -0.004 | -0.086 | -0.743 |
| 12 | -0.000 | -0.027 | 0.002 | -0.016 | 0.481 |
| 11 | -0.006 | -0.143 | -0.029 | -0.017 | -0.793 |
| 10 | 0.062 | 0.122 | 0.087 | 0.161 | 0.398 |
| 9 | -0.000 | -0.110 | -0.007 | 0.137 | 0.423 |
| 8 | 0.009 | 0.022 | -0.014 | -0.047 | 0.040 |
| 7 | -0.001 | -0.220 | -0.014 | 0.209 | -0.168 |
| 6 | 0.006 | 0.066 | -0.019 | -0.135 | 0.235 |
| 5 | -0.004 | -0.381 | -0.041 | 0.520 | 1.302 |
| 4 | -0.019 | -0.103 | -0.044 | 0.015 | -0.206 |
| 3 | 0.025 | 0.002 | -0.008 | -0.270 | 0.084 |
| 2 | -0.001 | -0.397 | 0.021 | 0.522 | -2.409 |
| 1 | -0.008 | -0.034 | 0.017 | -1.195 | 2.513 |
| Σ | -0.134 | -1.093 | 0.062 | -0.034 | 1.902 |

FIG. 5 shows the third embodiment of the objective of the present invention for a microscope having the numerical aperture of 0.4 particularly effective when used with the light having the wave length of 435.8 m$\mu$.

In FIG. 5, four lens groups I to IV are located closely to each other in front of exit pupil E at the object side to form a first part while two lens groups are located closely to each other at positions rearward of exit pupil E at the image side to form a second part. Each of the first I and the second lens group II at the object side is a meniscus with its concave surfaces directed toward the object side while each of the third III and the fourth lens group IV consists of at least two lens elements cemented to each other with the cemented surfaces thereof being concave toward the object side. The fifth lens group V is a meniscus with its concave surfaces directed toward the object side and is located a fairly great distance spaced from the fourth lens group IV, while the sixth lens group consists of three lens elements cemented to each other of which the intermediate lens element is a convex lens element.

The objective described above is characterized in that it satisfies the following relationships:

$$0.82f < f_I < 0.84f$$
$$10f < f_{II} < 22f$$
$$2.1f < d_{11} < 2.6f$$

where:

$f$ = the focal length of the entire system of the objective
$f_I$ = the resultant focal length of the first to the fourth lens group of the objective
$f_{II}$ = the resultant focal length of the fifth and the sixth lens group of the objective
$l$ = the distance between the first and the second part of the objective lens According to the above requirements, the following two examples are obtained in which the light having the wave length of 435.8 m$\mu$ is used and the numerical aperture N.A. is selected to be 0.4 and the magnification is selected to be $\frac{1}{10}\times$.

EXAMPLE 5

| | | | |
|---|---|---|---|
| $r_1 = -2.811$ | $d_1 = 5.930$ | | |
| $r_2 = -5.248$ | $d_2 = 0.106$ | $n = 1.49593$ | $\nu = 69.8$ |
| $r_3 = -15.394$ | $d_3 = 0.847$ | | |
| $r_4 = 40.219$ | $d_4 = 4.447$ | $n = 1.75376$ | $\nu = 29.2$ |
| $r_5 = -10.419$ | $d_5 = 0.402$ | $n = 1.65306$ | $\nu = 60.2$ |
| $r_6 = -38.686$ | $d_6 = 1.906$ | | |
| $r_7 = -10.844$ | $d_7 = 1.895$ | $n = 1.49365$ | $\nu = 84.4$ |
| $r_8 = -11.862$ | $d_8 = 0.212$ | $n = 1.56326$ | $\nu = 45.7$ |
| $r_9 = 28.850$ | $d_9 = 1.694$ | | |
| $r_{10} = 12.138$ | $d_{10} = 2.224$ | $n = 1.63103$ | $\nu = 43.8$ |
| $r_{11} = -45.700$ | $d_{11} = 25.134$ | $n = 1.43951$ | $\nu = 95.2$ |
| $r_{12} = -24.686$ | $d_{12} = 3.179$ | | |
| $r_{13} = -25.477$ | $d_{13} = 0.424$ | $n = 1.65306$ | $\nu = 60.2$ |
| $r_{14} = -773.434$ | $d_{14} = 1.165$ | | |
| $r_{15} = 11.958$ | $d_{15} = 2.859$ | $n = 1.69310$ | $\nu = 55.3$ |
| $r_{16} = -18.883$ | $d_{16} = 1.165$ | $n = 1.49365$ | $\nu = 84.4$ |
| $r_{17} = -23.251$ | | $n = 1.56326$ | $\nu = 45.7$ | where:

$ri$ ($i = 1, 2 \ldots 18$) = the radius of curvature of the respective surface of each of the lens elements beginning at the object side, the numeral being commonly used for the cemented surfaces $di$ ($i = 1, 2 \ldots 17$) = the thickness of each of the lens elements and the air gap beginning at the object side $n$ = refractive index with respect to the light having the light having the wave length of 435.8 m$\mu$ of the respective lens element beginning at the object side $\nu$ = Abbe number with respect to the light having the wave length of the respective lens element beginning at the object side and $f_1 = -63.214 \doteq 6.32f$
$f_2 = 46.899 \doteq 4.69f$
$f_3 = 29.454 \doteq 2.95f$
$f_4 = 63.470 \doteq 6.35f$
$f_5 = 2074.932 \doteq 207f$
$f_6 = 247.285 \doteq 24.7f$ where:

$fi$ ($i=1 \ldots 6$)=the focal length of each of the first to sixth lens groups beginning at the object side and, further $f_{1-4}=8.321 \doteq 0.832f$
$f_{56}=212.707 \doteq 21.3f$
$d_{11}=25.134 \doteq 2.51f$ where:

$f_{1-4}$=the resultant focal length of the first to fourth lens groups
$f_{56}$=the resultant focal length of the fifth and sixth lens groups

EXAMPLE 6

| | | | |
|---|---|---|---|
| $r_1=-2.473$ | $d_1=5.254$ | | |
| $r_2=-4.464$ | $d_2=0.094$ | $n=1.49365$ | $\nu=84.4$ |
| $r_3=-25.131$ | $d_3=0.751$ | | |
| $r_4=29.307$ | $d_4=3.941$ | $n=1.63103$ | $\nu=43.8$ |
| $r_5=-9.221$ | $d_5=0.357$ | $n=1.43951$ | $\nu=95.2$ |
| $r_6=-72.772$ | $d_6=1.689$ | | |
| $r_7=-9.829$ | $d_7=1.679$ | $n=1.49365$ | $\nu=84.4$ |
| $r_8=-9.830$ | $d_8=0.188$ | $n=1.56326$ | $\nu=45.7$ |
| $r_9=27.450$ | $d_9=1.970$ | | |
| $r_{10}=-14.332$ | $d_{10}=1.501$ | $n=1.57976$ | $\nu=63.1$ |
| $r_{11}=\sim$ | $d_{11}=22.270$ | $n=1.67248$ | $\nu=33.8$ |
| $r_{12}=24.692$ | $d_{12}=2.815$ | | |
| $r_{13}=-32.082$ | $d_{13}=0.375$ | $n=1.65306$ | $\nu=60.2$ |
| $r_{14}=40.823$ | $d_{14}=0.938$ | | |
| $r_{15}=10.795$ | $d_{15}=2.533$ | $n=1.69310$ | $\nu=35.3$ |
| $r_{16}=-14.412$ | $d_{16}=1.032$ | $n=1.49365$ | $\nu=84.4$ |
| $r_{17}=28.061$ | | $n=1.56326$ | $\nu=45.7$ | where:

$ri$ ($i=1, 2 \ldots 18$)=the radius of curvature of the respective surface of each of the lens elements beginning at the object side, the numeral being commonly used for the cemented surfaces
$di$ ($i=1, 2 \ldots 17$)=the thickness of each of the lens elements and the air gap beginning at the object side
$n$=refractive index with respect to the light having the wave length of 435.8 m$\mu$ of the respective lens element beginning at the object side
$\nu$=Abbe number with respect to the light having the wave length of 587.6 m$\mu$ of the respective lens element beginning at the object side and $f_1=-87.563 \doteq 8.8f$
$f_2=153.180 \doteq 15.3f$
$f_3=22.384 \doteq 2.3f$
$f_4=67.469 \doteq 6.7f$
$f_5=-193.214 \doteq -19.3f$
$f_6=71.996 \doteq 7.2f$ where:

$fi$ ($i=1 \ldots 6$)=the focal length of each of the first to sixth lens groups beginning at the object side and, further $f_{1-4}=8.251 \doteq 0.825f$
$f_{56}=104.574 \doteq 10.5f$
$d_{11}=22.270 \doteq 2.23f$ where:

$f_{1-4}$=the resultant focal length of the first to fourth lens groups
$f_{56}$=the resultant focal length of the fifth and sixth lens groups Various aberrations of Example 6 are shown in FIGS. 6A–6D. FIG. 6A shows the longitudinal aberration of the spherical aberration, FIG. 6B showing the off-axial astigmatism at $y=6$, FIGS. 6C, 6D showing the transverse aberration of the off-axial coma at $y=6$ and at $y=4.2$, respectively.

The following table shows the Berek's expression obtained by Seidel coefficients calculated on the basis of Example 6 under the conditions that a parallel light bundle is incident to the objective in the reverse directions from the image side and the value of $f$ is made to 1.

| | A | B | Γ | P | Δ |
|---|---|---|---|---|---|
| 17 | 0.010 | 0.082 | 0.029 | 0.128 | 0.591 |
| 16 | −0.010 | −0.015 | −0.012 | −0.021 | −0.044 |
| 15 | −0.163 | −0.034 | 0.074 | −0.073 | 0.049 |
| 14 | 0.020 | 0.121 | −0.049 | 0.100 | −0.547 |
| 13 | −0.000 | −0.019 | −0.003 | 0.123 | 0.716 |
| 12 | −0.002 | −0.038 | −0.008 | −0.160 | −0.924 |
| 11 | −0.000 | −0.047 | 0.004 | 0.000 | 0.524 |
| 10 | −0.004 | −0.184 | −0.029 | −0.024 | −1.348 |
| 9 | 0.022 | 0.033 | 0.027 | 0.134 | 0.203 |
| 8 | 0.007 | 0.399 | 0.052 | 0.366 | 5.920 |
| 7 | 0.000 | 0.025 | 0.003 | −0.030 | −0.049 |
| 6 | 0.025 | 0.021 | 0.023 | −0.045 | −0.022 |
| 5 | −0.000 | −0.380 | −0.013 | 0.331 | −1.468 |
| 4 | −0.023 | −0.299 | −0.084 | −0.028 | −1.171 |
| 3 | 0.017 | 0.012 | −0.014 | −0.256 | 0.204 |
| 2 | −0.000 | −0.774 | −0.006 | 0.740 | −4.107 |
| 1 | −0.031 | −0.111 | 0.059 | −1.337 | 2.729 |
| Σ | −0.134 | −1.208 | 0.054 | −0.051 | 1.256 |

I claim:

1. Objective having seven lens groups for obtaining a high resolving power, wherein the improvement comprises the fact that the first and second lens groups at the object side constitute a first part and the third and fourth lens groups constitute a second part spaced a distance from said first part, while the fifth to seventh lens groups constitute a third part spaced a distance from said second part, said first lens group consisting of three lens elements cemented to each other of which the intermediate lens element is convex, said second lens group being a single concave meniscus having concave surfaces directed to the image side and located adjacent to said first lens group, said third lens group consisting of two lens elements cemented to each other and having a positive power, with their cemented surfaces being concave toward the image side, and the fourth lens group being a positive meniscus having convex surfaces directed toward the object side, said fifth lens group being a positive meniscus having concave surfaces directed toward the image side, said sixth lens group consisting of two lens elements cemented to each other to form a meniscus having concave surfaces directed toward the image side, and said seventh lens group being a negative meniscus having a great thickness and having concave surfaces directed toward the image side, said fifth to seventh lens groups being closely arranged to each other, said objective satisfying the following relationships:

$$1.2f > -r_3 > 0.8f$$

$$0.6f < r_{14} < 0.8f$$

$$0.4f < d_{11} < 0.8f$$

$$40f < |f_I|$$

$$1.2f < f_{II} < 3f$$

where:
$f$=the focal length of the entire system of the objective
$f_I$=the focal length of the first part of the objective
$f_{II}$=the focal length of the second part of the objective
$r_3$=the radius of curvature of the third surface of the lens elements of the first lens group
$r_{14}$=the radius of curvature of the surface of the lens element which is fourteenth from the object side
$d_{11}$=the distance between the second and the third part of the objective 2. Objective according to claim 1 particularly for use with the light having the wave length of about 435.8 m$\mu$, further satisfying the following relationships with the value of $f$ calculated as being 50:

| | | | |
|---|---|---|---|
| $r_1=240.603$ | $d_1=5.659$ | | |
| $r_2=72.030$ | $d_2=12.575$ | $n=1.56395$ | $\nu=45.4$ |
| $r_3=-51.849$ | $d_3=5.659$ | $n=1.49593$ | $\nu=69.8$ |
| $r_4=-259.303$ | $d_4=1.258$ | $n=1.70970$ | $\nu=53.3$ |
| $r_5=133.024$ | $d_5=12.575$ | | |
| $r_6=118.242$ | $d_6=132.042$ | $n=1.65306$ | $\nu=60.2$ |
| $r_7=296.530$ | $d_7=6.288$ | | |
| $r_8=94.606$ | $d_8=9.557$ | $n=1.67248$ | $\nu=33.8$ |
| $r_9=-171.283$ | $d_9=0.629$ | $n=1.58142$ | $\nu=43.7$ |
| $r_{10}=122.892$ | $d_{10}=7.545$ | | |
| $r_{11}=289.431$ | $d_{11}=32.508$ | $n=1.65306$ | $\nu=60.2$ |
| $r_{12}=85.125$ | $d_{12}=7.545$ | | |
| $r_{13}=95.707$ | $d_{13}=0.629$ | $n=1.65306$ | $\nu=60.2$ |
| $r_{14}=35.703$ | $d_{14}=10.060$ | | |
| $r_{15}=1067.608$ | $d_{15}=5.030$ | $n=1.49593$ | $\nu=69.8$ |
| $r_{16}=95.687$ | $d_{16}=0.629$ | $n=1.67249$ | $\nu=33.8$ |
| $r_{17}=37.304$ | $d_{17}=33.954$ | | |
| $r_{18}=16.377$ | | $n=1.49593$ | $\nu=69.8$ | where:

$ri$ ($i=1, 2 \ldots 18$)=the radius of curvature of the respective surface of each of the lens elements beginning at the object side, the numeral being commonly used for the cemented surfaces.

$di$ ($i=1, 2 \ldots 17$)=the thickness of each of the lens elements and the air gap beginning at the object side $n$=refractive index with respect to the light having the wave length of 435.8 m$\mu$ of the respective lens element beginning at the object side $\nu$=Abbe number with respect to the light having a wave length of 587.6 m$\mu$ of the respective lens element beginning at the object side and
$r_3=-1.037f$
$r_{14}=0.714f$
$d_{11}=0.650f$
$f_2=1.258f$
$f_I=-61.342f$
$f_{II}=2.580f$ where:

$f_2$=the focal length of the convex lens element located at the center of the first lens group.

3. Objective according to claim 1 particularly for use with the light having the wave length of about 435.8 m$\mu$, further satisfying the following relationships with the value of $f$ calculated as being 50.

| | | | |
|---|---|---|---|
| $r_1=247.401$ | $d_1=5.53$ | | |
| $r_2=71.967$ | $d_2=12.30$ | $n=1.56395$ | $\nu=45.4$ |
| $r_3=-51.124$ | $d_3=5.53$ | $n=1.49593$ | $\nu=69.8$ |
| $r_4=-252.997$ | $d_4=1.23$ | $n=1.71060$ | $\nu=50.7$ |
| $r_5=126.573$ | $d_5=12.30$ | | |
| $r_6=118.794$ | $d_6=129.11$ | $n=1.65306$ | $\nu=60.2$ |
| $r_7=290.847$ | $d_7=6.15$ | | |
| $r_8=91.210$ | $d_8=9.34$ | $n=1.67248$ | $\nu=33.8$ |
| $r_9=-159.674$ | $d_9=0.61$ | $n=1.57976$ | $\nu=63.1$ |
| $r_{10}=125.754$ | $d_{10}=7.38$ | | |
| $r_{11}=263.44$ | $d_{11}=31.78$ | $n=1.65306$ | $\nu=60.2$ |
| $r_{12}=81.732$ | $d_{12}=7.38$ | | |
| $r_{13}=95.253$ | $d_{13}=0.61$ | $n=1.65306$ | $\nu=60.2$ |
| $r_{14}=34.512$ | $d_{14}=9.84$ | | |
| $r_{15}=764.912$ | $d_{15}=4.92$ | $n=1.49593$ | $\nu=69.8$ |
| $r_{16}=87.755$ | $d_{16}=0.61$ | $n=1.67248$ | $\nu=33.8$ |
| $r_{17}=36.387$ | $d_{17}=33.20$ | | |
| $r_{18}=16.019$ | | $n=1.49593$ | $\nu=69.8$ | where:

$ri$ ($i=1, 2 \ldots 18$)=the radius of curvature of the respective surface of each of the lens elements beginning at the object side, the numeral being commonly used for the cemented surface $di$ ($i=1, 2 \ldots 17$)=the thickness of each of the lens elements and the air gap beginning at the object side $n$=refractive index with respect to the light having the wave length of 435.8 m$\mu$ of the respective lens element beginning at the object side $\nu$=Abbe number with respect to the light having the wave length of 587.6 m$\mu$ of the respective lens element beginning at the object side and
$r_3=-1.022f$
$r_{14}=0.692f$
$d_{11}=0.636f$
$f_2=1.014f$
$f_I=133.36f$
$f_{II}=2.127f$ where:

$f_2$=the focal length of the convex lens element located at the center of the first lens group.

4. Objective having seven lens groups for obtaining a high resolving power, wherein the improvement comprises the fact that the first and second lens groups at the object side are located closely to each other and constitute a first part and the third to fifth lens groups are located closely to each other and constitute a second part spaced a distance from said first part while the sixth and seventh lens groups are located closely to each other and constitute a third part spaced a distance from said second part, said first lens group being of a meniscus with its convex surfaces directed toward the image side, said second lens group consisting of cemented lens elements in the form of a positive meniscus as a whole with the air interfaces and the cemented surfaces thereof being convex toward the image side, each of said third and said fourth lens group being of a positive meniscus with its surfaces being convex toward the image side, said fifth lens group consisting of cemented lens elements of a positive power with the cemented surfaces being convex toward the image side, said sixth lens groups being of a meniscus with its convex surfaces directed toward the image side, said seventh lens group consisting of three lens elements cemented to each other of which the intermediate lens element is of a convex lens element, said objective satisfying the following relationships:

$3.5f<f_I<3.6f$
$2.1f<f_{II}<2.2f$
$21f<f_{III}<22f$
$0.55f<l_1<0.57f$
$2.2f<l_2<2.3f$ where:

$f$=the focal length of the entire system of the objective
$f_I$=the focal length of the first part of the objective
$f_{II}$=the focal length of the second part of the objective
$f_{III}$=the focal length of the third part of the objective
$l_1$=the distance between the first and the second part of the objective
$l_2$=the distance between the second and the third part of the objective.

5. Objective according to claim 4 particularly for use with the light having the wave length of about 435.8 m$\mu$, further satisfying the following relationships with the value of $f$ calculated as being 10:

| | | | |
|---|---|---|---|
| $r_1=-2.766$ | $d_1=5.866$ | | |
| $r_2=-6.373$ | $d_2=0.109$ | $n=1.49593$ | $\nu=69.8$ |
| $r_3=-14.847$ | $d_3=0.869$ | | |
| $r_4=-66.620$ | $d_4=1.738$ | $n=1.63103$ | $\nu=43.8$ |
| $r_5=-5.875$ | $d_5=5.653$ | $n=1.43951$ | $\nu=45.2$ |
| $r_6=-29.693$ | $d_6=1.304$ | | |
| $r_7=-19.660$ | $d_7=0.109$ | $n=1.65306$ | $\nu=60.2$ |
| $r_8=-89.050$ | $d_8=1.304$ | | |
| $r_9=-28.327$ | $d_9=0.109$ | $n=1.65306$ | $\nu=60.2$ |
| $r_{10}=23.348$ | $d_{10}=1.651$ | | |
| $r_{11}=-21.171$ | $d_{11}=1.086$ | $n=1.57976$ | $\nu=63.1$ |
| $r_{12}=337.616$ | $d_{12}=22.813$ | $n=1.67248$ | $\nu=33.8$ |
| $r_{13}=-44.285$ | $d_{13}=2.173$ | | |
| $r_{14}=-28.705$ | $d_{14}=0.217$ | $n=1.65306$ | $\nu=60.2$ |
| $r_{15}=70.301$ | $d_{15}=0.978$ | | |
| $r_{16}=9.818$ | $d_{16}=2.173$ | $n=1.69992$ | $\nu=32.1$ |
| $r_{17}=-12.407$ | $d_{17}=0.978$ | $n=1.49593$ | $\nu=69.8$ |
| $r_{18}=-46.030$ | | $n=1.56395$ | $\nu=45.4$ | where:

$ri$ ($i=1, 2 \ldots 18$)=the radius of curvature of the respective surface of each of the lens elements beginning at the object side, the numeral being commonly used for the cemented surfaces $di$ ($i=1, 2 \ldots 17$)=the thickness of each of the lens elements and the air gap beginning at the object side $n$ = refractive index with respect to the light having the wave length of 435.8 m$\mu$ of the respective lens element beginning at the object side $\nu$ = Abbe number with respect to the light having the wave length of 587.6 m$\mu$ of the respective lens element beginning at the object side and $f_I = 34.95 \doteq 3.50f$
$f_{II} = 21.39 \doteq 2.14f$
$f_{III} = 219.56 \doteq 22.0f$
$l_1 = d_5 = 5.653 \doteq 0.57f$
$l_2 = d_{12} = 22.813 \doteq 2.28f$ 6. Objective according to claim 4 particularly for use with the light having the wave length of about 435.8 m$\mu$, further satisfying the following relationships with the value of $f$ calculated as being 10:

| | | | |
|---|---|---|---|
| $r_1 = -2.774$ | $d_1 = 5.860$ | | |
| $r_2 = -6.355$ | $d_2 = 0.108$ | $n = 1.49593$ | $\nu = 69.8$ |
| $r_3 = -14.341$ | $d_3 = 0.868$ | | |
| $r_4 = -55.008$ | $d_4 = 1.736$ | $n = 1.63103$ | $\nu = 43.8$ |
| $r_5 = -5.867$ | $d_5 = 5.648$ | $n = 1.43951$ | $\nu = 95.2$ |
| $r_6 = -29.273$ | $d_6 = 1.302$ | | |
| $r_7 = -18.883$ | $d_7 = 0.103$ | $n = 1.65306$ | $\nu = 60.2$ |
| $r_8 = -83.944$ | $d_8 = 1.302$ | | |
| $r_9 = -28.814$ | $d_9 = 0.108$ | $n = 1.65306$ | $\nu = 60.2$ |
| $r_{10} = 22.720$ | $d_{10} = 1.650$ | | |
| $r_{11} = -20.449$ | $d_{11} = 1.085$ | $n = 1.57976$ | $\nu = 63.1$ |
| $r_{12} = 253.100$ | $d_{12} = 22.791$ | $n = 1.67248$ | $\nu = 33.8$ |
| $r_{13} = -46.050$ | $d_{13} = 2.170$ | | |
| $r_{14} = -28.361$ | $d_{14} = 0.217$ | $n = 1.65306$ | $\nu = 60.2$ |
| $r_{15} = 72.420$ | $d_{15} = 0.977$ | | |
| $r_{16} = 9.799$ | $d_{16} = 2.170$ | $n = 1.69992$ | $\nu = 32.1$ |
| $r_{17} = 12.007$ | $d_{17} = 0.977$ | $n = 1.49593$ | $\nu = 69.8$ |
| $r_{18} = -46.832$ | | $n\ 1.56395$ | $\nu = 45.4$ | where:

$ri$ ($i = 1, 2 \ldots 18$) = the radius of curvature of the respective surface of each of the lens elements beginning at the object side, the numeral being commonly used for the cemented surfaces $di$ ($i = 1, 2 \ldots 17$) = the thickness of each of the lens elements and the air gap beginning at the object side $n$ = refractive index with respect to the light having the wave length of 435.8 m$\mu$ of the respective lens element beginning at the object side $\nu$ = Abbe number with respect to the light having the wave length of 587.6 m$\mu$ of the respective lens element beginning at the object side and $f_I = 35.72 \doteq 3.57f$
$f_{II} = 21.32 \doteq 2.13f$
$f_{III} = 215.04 \doteq 21.5f$
$l_1 = d_5 = 5.648 \doteq 0.56f$
$l_2 = d_{12} = 22.791 \doteq 2.28f$ 7. Objective having six lens groups for obtaining a high resolving power, wherein the improvement comprises the fact that the first to fourth lens groups at the object side are arranged closely to each other and constitute a first part while the fifth and the sixth lens groups are arranged closely to each other and constitute a second part spaced a distance from said first part, said first lens group being of a negative meniscus with its convex surfaces directed to the image side, said second lens group consisting of cemented lens elements of a positive power in the form of a meniscus as a whole with its convex surfaces directed toward the image side, each of said third and fourth lens groups consisting of cemented lens elements of a positive power in the form of a meniscus as a whole with the cemented convex surfaces thereof directed toward the image side, said fifth lens group being of a negative meniscus with its convex surfaces directed toward the image side, said sixth lens group consisting of three lens elements cemented to each other of which the intermediate lens element is of a convex lens element, said objective satisfying the following relationships:

$0.82f < f_I < 0.84f$
$10f < f_{II} < 22f$
$2.1f < l < 2.6f$ where:

$f$ = the focal length of the entire system of the objective
$f_I$ = the focal length of the first part of the objective
$f_{II}$ = the focal length of the second part of the objective
$l$ = the distance between the first and the second part of the objective lens 8. Objective according to claim 7 particularly for use with the light having the wave length of about 435.8 m$\mu$, further satisfying the following relationship with the value of $f$ calculated as being 10:

| | | | |
|---|---|---|---|
| $r_1 = -2.811$ | $d_1 = 5.930$ | | |
| $r_2 = -5.248$ | $d_2 = 0.106$ | $n = 1.49593$ | $\nu = 69.8$ |
| $r_3 = -15.394$ | $d_3 = 0.847$ | | |
| $r_4 = 40.219$ | $d_4 = 4.447$ | $n = 1.75376$ | $\nu = 29.2$ |
| $r_5 = -10.419$ | $d_5 = 0.402$ | $n = 1.65306$ | $\nu = 60.2$ |
| $r_6 = -58.686$ | $d_6 = 1.906$ | | |
| $r_7 = -10.844$ | $d_7 = 1.895$ | $n = 1.49365$ | $\nu = 84.4$ |
| $r_8 = -11.862$ | $d_8 = 0.212$ | $n = 1.56326$ | $\nu = 45.7$ |
| $r_9 = 28.850$ | $d_9 = 1.694$ | | |
| $r_{10} = 12.138$ | $d_{10} = 2.224$ | $n = 1.63103$ | $\nu\ 43.8$ |
| $r_{11} = -45.700$ | $d_{11} = 25.134$ | $n = 1.43951$ | $\nu = 95.2$ |
| $r_{12} = -24.686$ | $d_{12} = 3.179$ | | |
| $r_{13} = -25.477$ | $d_{13} = 0.424$ | $n = 1.65306$ | $\nu = 60.2$ |
| $r_{14} = -773.484$ | $d_{14} = 1.165$ | | |
| $r_{15} = 11.958$ | $d_{15} = 2.859$ | $n = 1.69310$ | $\nu = 55.3$ |
| $r_{16} = -18.883$ | $d_{16} = 1.165$ | $n = 1.49365$ | $\nu = 84.4$ |
| $r_{17} = -23.251$ | | $n = 1.56326$ | $\nu = 45.7$ | where:

$ri$ ($i = 1, 2 \ldots 18$) = the radius of curvature of the respective surface of each of the lens elements beginning at the object side, the numeral being commonly used for the cemented surfaces $di$ ($i = 1, 2 \ldots 17$) = the thickness of each of the lens elements and the air gap beginning at the object side $n$ = refractive index with respect to the light having the wave length of 435.8 m$\mu$ of the respective lens element beginning at the object side $\nu$ = Abbe number with respect to the light having the wave length of the respective lens element beginning at the object side and $f_1 = -63.214 \doteq -6.32f$
$f_2 = 46.899 \doteq 4.69f$
$f_3 = 29.454 \doteq 2.95f$
$f_4 = 63.470 \doteq 6.35f$
$f_5 = 2074.932 \doteq 207.f$
$f_6 = 247.285 \doteq 24.7f$ where:

$fi$ ($i = 1 \ldots 6$) = the focal length of each of the first to sixth lens groups beginning at the object side and, further $f_{1-4} = 8.321 \doteq 0.832f$
$f_{56} = 212.707 \doteq 21.3f$
$d_{11} = 25.134 \doteq 2.51f$ where:

$f_{1-4}$ = the resultant focal length of the first to fourth lens groups $f_{56}$ = the resultant focal length of the fifth and sixth lens groups.

9. Objective according to claim 7 particularly for use with the light having the wave length of about 435.8 m$\mu$, further satisfying the following relationships with the value of $f$ calculated as being 10:

| | | | |
|---|---|---|---|
| $r_1 = -2.473$ | $d_1 = 5.254$ | | |
| $r_2 = -4.464$ | $d_2 = 0.094$ | $n = 1.49365$ | $\nu = 84.4$ |
| $r_3 = -15.131$ | $d_3 = 0.751$ | | |
| $r_4 = 29.307$ | $d_4 = 3.941$ | $n = 1.63103$ | $\nu = 43.8$ |
| $r_5 = -9.221$ | $d_5 = 0.357$ | $n = 1.43951$ | $\nu = 95.2$ |
| $r_6 = -72.772$ | $d_6 = 1.689$ | | |
| $r_7 = -9.829$ | $d_7 = 1.679$ | $n = 1.49365$ | $\nu = 84.4$ |
| $r_8 = -9.830$ | $d_8 = 0.188$ | $n = 1.56326$ | $\nu = 45.7$ |
| $r_9 = 27.450$ | $d_9 = 1.970$ | | |
| $r_{10} = -14.332$ | $d_{10} = 1.501$ | $n\ 1.57976$ | $\nu = 63.1$ |
| $r_{11} = \infty$ | $d_{11} = 22.270$ | $n = 1.67248$ | $\nu = 33.8$ |
| $r_{12} = 24.692$ | $d_{12} = 2.815$ | | |
| $r_{13} = -32.082$ | $d_{13} = 0.375$ | $n = 1.65306$ | $\nu = 60.2$ |
| $r_{14} = 40.823$ | $d_{14} = 0.938$ | | |
| $r_{15} = 10.795$ | $d_{15} = 2.533$ | $n = 1.69310$ | $\nu = 35.3$ |
| $r_{16} = -14.412$ | $d_{16} = 1.032$ | $n = 1.49365$ | $\nu = 84.4$ |
| $r_{17} = 28.061$ | | $n = 1.56326$ | $\nu = 45.7$ | where:

$ri$ ($i = 1, 2 \ldots 18$) = the radius of curvature of the respective surface of each of the lens elements beginning at the object side, the numeral being commonly used for the cemented surfaces $d_i$ ($i=1, 2 \ldots 17$) = the thickness of each of the lens elements and the air gap beginning at the object side $n$ = refractive index with respect to the light having the wave length of 435.8 m$\mu$ of the respective lens element beginning at the object side $\nu$ = Abbe number with respect to the light having the wave length of 587.6 m$\mu$ of the respective lens element beginning at the object side.

and $f_1 = -87.563 \doteq -8.8f$
$f_2 = 153.180 \doteq 15.3f$
$f_3 = 22.384 \doteq 2.3f$
$f_4 = 67.469 \doteq 6.7f$
$f_5 = -193.214 \doteq -19.3f$
$f_6 = 71.996 \doteq 7.2f$ where:

$f_i$ ($i=1 \ldots 6$) = the focal length of each of the first to sixth lens groups beginning at the object side and, further $f_{1-4} = 8.251 \doteq 0.825f$
$f_{56} = 104.574 \doteq 10.5f$
$d_{11} = 22.270 \doteq 2.23f$ where:

$f_{1-4}$ = the resultant focal length of the first to fourth lens groups $f_{56}$ = the resultant focal length of the fifth and sixth lens groups.

References Cited

UNITED STATES PATENTS

| | | | |
|---|---|---|---|
| 3,450,463 | 6/1969 | Yasuda | 350—215 X |
| 3,572,902 | 3/1971 | Uetake | 350—177 |

JOHN K. CORBIN, Primary Examiner

U.S. Cl. X.R.

350—177, 215